US006787867B2

United States Patent
Sakurai et al.

(10) Patent No.: US 6,787,867 B2
(45) Date of Patent: Sep. 7, 2004

(54) PLANAR LIGHTWAVE CIRCUIT DEVICE AND MANUFACTURING METHOD THEREFOR

(75) Inventors: Yasuki Sakurai, Kawasaki (JP); Michiharu Itou, Kawasaki (JP); Takashi Shiotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/273,091

(22) Filed: Oct. 18, 2002

(65) Prior Publication Data

US 2003/0197233 A1 Oct. 23, 2003

(30) Foreign Application Priority Data

Apr. 23, 2002 (JP) ........................................ 2002-120665

(51) Int. Cl.$^7$ ............................................. H01L 29/72
(52) U.S. Cl. ...................... 257/415; 257/416; 257/418; 385/24; 385/39; 385/48; 385/49
(58) Field of Search ................................ 257/415, 416, 257/418; 385/24, 39, 48, 49

(56) References Cited

U.S. PATENT DOCUMENTS

2003/0113067 A1 * 6/2003 Koh et al. ................... 385/48

FOREIGN PATENT DOCUMENTS

| JP | 06-029211 | 2/1994 |
|----|-----------|--------|
| JP | 08/083755 | 3/1996 |
| JP | 09/283621 | 10/1997 |
| JP | 2000-164594 | 6/2000 |
| JP | 2001-188337 | 7/2001 |

* cited by examiner

*Primary Examiner*—Edward Wojciechowicz
(74) *Attorney, Agent, or Firm*—Staas & Halsey LLP

(57) ABSTRACT

A manufacturing method for a planar lightwave circuit device. A lift-off mask layer is formed on a planar lightwave circuit composed of cores and a cladding. The lift-off mask layer is next exposed to light by using a mask having a plurality of first patterns respectively corresponding to the cores and a plurality of second patterns each formed on at least one side of each first pattern in spaced relationship therewith. A wiring pattern material layer is next deposited on the lift-off mask layer exposed above, and the lift-off mask layer is next stripped off to thereby form a plurality of real patterns respectively corresponding to the first patterns and a plurality of dummy patterns respectively corresponding to the second patterns, from the wiring pattern material layer.

8 Claims, 10 Drawing Sheets

PLANAR LIGHTWAVE CIRCUIT DEVICE AND MANUFACTURING METHOD THEREFOR

BACKGROUND OF THE INVENTION

1. Field of the Invention

The present invention relates to a planar lightwave circuit device such as a variable optical attenuator (VOA), optical modulator, and optical switch, and also to a manufacturing method therefor.

2. Description of the Related Art

To realize a larger-scale optical transmission line system with an increase in communication capacity, an optical device is also desired to have a configuration of higher integration and multiple channels. As an optical device responding to such demands, a planar lightwave circuit device (PLC device) is known. The PLC device can be manufactured by utilizing a semiconductor fabrication process including film deposition and etching, and the whole process can be performed in the condition of a wafer, which provides superior mass productivity. Furthermore, since a device configuration with no driving parts can be made, the PLC device is also superior in stability.

The PLC device is manufactured in the following manner. An undercladding layer is first deposited on an Si substrate by CVD. A core layer is next deposited on the undercladding layer by CVD. The core layer is next etched by photolithography and reactive ion etching (RIE) to form a plurality of cores. An overcladding layer is next deposited on the undercladding layer by CVD so as to embed the cores. Each of the undercladding layer, the core layer, and the overcladding layer is formed by a film of $SiO_2$ doped with B, P, or Ge so as to change a refractive index.

Since the overcladding layer is deposited above the cores, the surface of the overcladding layer is formed with a plurality of ridge portions respectively corresponding to the cores. These ridge portions can be flattened under the conditions of heat treatment (high temperature and long duration) after deposition of the overcladding layer. However, such heat treatment causes deformation of the cores and deviation of the core positions, causing a degradation in optical device characteristics. Accordingly, it is difficult to satisfy both the optical device characteristics and the flattening of the surface of the PLC device. Further, the flattening as by polishing makes the fabrication process complicated. Therefore, particularly in a PLC device controlling light by using an external signal (electrical signal), it is desirable to adopt a technique for forming high-accuracy wiring patterns on the uneven surface of a cladding layer as having the ridge portions above the cores.

As an optical device having wiring patterns on the uneven surface of a PLC with ridge portions, a variable optical attenuator (VOA) utilizing a thermo-optic effect is known, for example. The VOA is an optical device of such a type that thin film heaters are formed on the surface of an overcladding at positions above the cores, that electric powers are applied to the thin film heaters to thereby control the phase of light with a change in refractive index of the cores by the thermo-optic effect, and that the attenuation is controlled by utilizing the interference of light. As primary methods for forming wiring patterns including the thin film heaters, dry etching, wet etching, and a lift-off process are expected. Of these methods, both the dry etching and the wet etching have a decisive disadvantage that the material usable for the wiring patterns is limited.

To the contrary, the lift-off process has excellent advantages that the wiring patterns can be formed of any material that can be evaporated or sputtered, that is, the degree of freedom of material selection is high, and that any special apparatus such as an RIE apparatus is not required. The thin film heaters in the VOA are formed by the lift-off process in the following manner. A photoresist is first applied to the surface of a planar lightwave circuit (PLC) composed of a cladding and cores embedded in the cladding. The photoresist is next prebaked at a given temperature. The photoresist is next exposed to light by using a mask, and exposed portions of the photoresist corresponding to the cores are next removed by development. The photoresist after the development is postbaked at a given temperature. Thereafter, a thin film heater material such as Ti/Pt is uniformly deposited on the photoresist, and the photoresist is next removed by an organic solvent to thereby form the thin film heaters on the cladding at the positions corresponding to the cores.

In forming wiring patterns such as thin film heaters by the lift-off process, resist shrinkage occurs due to the baking of the photoresist or the stress during the film deposition. This resist shrinkage strongly depends on the thickness of the resist present between the patterns and the length of the resist present between the patterns. In the case of forming wiring patterns such as thin film heaters on the uneven surface of a cladding having random ridge portions, not only the length of the resist present between the heater patterns, but also the thickness of the resist present between the heater patterns becomes nonuniform. Accordingly, as compared with the case of forming wiring patterns on the flat surface of a cladding, variations in dimensions of the patterns become remarkable, resulting in a reduction in yield of device chips.

This problem will now be further described with reference to FIG. 1. A planar lightwave circuit 4 composed of a cladding 6 and cores 8 is formed on a substrate 2. A photoresist 10 is applied to the surface of the planar lightwave circuit 4. After baking the photoresist 10, patterning of the photoresist 10 is performed. At this time, the shrinkage of the photoresist 10 occurs. This resist shrinkage is accelerated by the stress during the film deposition to be performed later. Accordingly, while the desired dimensions in the resist pattern are a=b=c in FIG. 1, the actual dimensions become a<b, c because of the resist shrinkage. This is due to the fact that the volume of each side portion of the photoresist 10 is larger than the volume of a central portion of the photoresist 10 as viewed in FIG. 1, so that the amount of shrinkage of the photoresist 10 at each side portion becomes larger than that at the central portion.

Particularly in the VOA, each thin film heater must be positioned over the corresponding core symmetrically with respect to the corresponding core, so as to efficiently supply heat to the corresponding core. However, when the volume of a portion of the photoresist 10 on one side of each heater pattern is different from the volume of another portion of the photoresist 10 on the other side of this heater pattern as shown in FIG. 2, the amounts of resist shrinkage on the opposite sides of the heater pattern become different from each other. As a result, the center position of the heater pattern shown by Q in FIG. 2 is deviated from an extension P from the center of the core 8, causing an increase and variations in power consumption.

FIG. 3 shows the relation between resist length and heater line width in the case that the heater is formed by using a mask having a width of 33 $\mu$m. As apparent from FIG. 3, the heater line width increases with an increase in the resist length. This will be due to the fact that the resist shrinkage becomes larger with an increase in the resist length. FIG. 4 shows the relation between resist length and variations in heater line width in the plane of a wafer. As apparent from FIG. 4, the variations in heater line width increase with an increase in the resist length.

SUMMARY OF THE INVENTION

It is therefore an object of the present invention to provide a planar lightwave circuit device improved in formed position and dimensional accuracy of a real pattern.

It is another object of the present invention to provide a manufacturing method for a planar lightwave circuit device which can suppress the resist shrinkage in a lift-off wiring process to improve the forming position and dimensional accuracy of a real pattern.

In accordance with an aspect of the present invention, there is provided a planar lightwave circuit device including a substrate; a planar lightwave circuit formed on the substrate, the planar lightwave circuit having a cladding and a plurality of cores embedded in the cladding; a plurality of first patterns formed on the cladding so as to respectively correspond to the cores; and a plurality of second patterns formed on the cladding so that each of the second patterns is arranged on at least one side of each first pattern in spaced relationship therewith.

Preferably, each first pattern includes a thin film heater formed of a material selected from the group consisting of Ti, Pt, Ni, Rh, Cr, and $Ta_2N$ or an alloy thereof. Preferably, each second pattern is formed of a material selected from the group consisting of Ti, Pt, Ni, Rh, Cr, and $Ta_2N$ or an alloy thereof, and one of the second patterns formed at the outermost position on the planar lightwave circuit has a width larger than that of each of the other second patterns.

In accordance with another aspect of the present invention, there is provided a manufacturing method for a planar lightwave circuit device, including the steps of depositing an undercladding layer on a substrate; depositing a core layer on the undercladding layer; etching the core layer to form a plurality of cores; depositing an overcladding layer on the undercladding layer so as to cover the cores; forming a lift-off mask layer on the overcladding layer; patterning the lift-off mask layer so as to form a plurality of first opening patterns respectively corresponding to the cores and a plurality of second opening patterns each formed on at least one side of each first opening pattern in spaced relationship therewith; depositing a wiring pattern material layer on the lift-off mask layer; and stripping off the lift-off mask layer patterned to thereby form a plurality of first patterns respectively corresponding to the cores and a plurality of second patterns each formed on at least one side of each first pattern in spaced relationship therewith, from the wiring pattern material layer.

Preferably, the second patterns are formed at positions such that the volume of a portion of the lift-off mask layer present between each first pattern and each second pattern on one side of each first pattern is substantially equal to the volume of another portion of the lift-off mask layer present between each first pattern and each second pattern on the other side of each first pattern. Preferably, each first pattern and each second pattern are formed of a material selected from the group consisting of Ti, Pt, Ni, Rh, Cr, and $Ta_2N$ or an alloy thereof. Preferably, the lift-off mask layer includes a photoresist.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
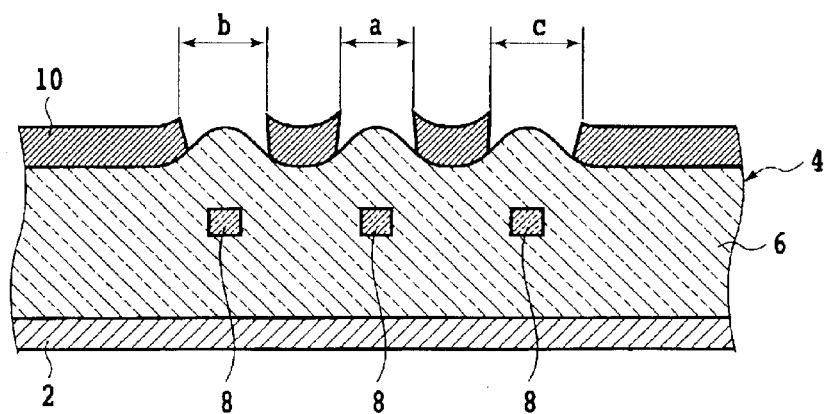
FIG. 1 is a sectional view for illustrating a problem in the prior art method.
Figure 2:
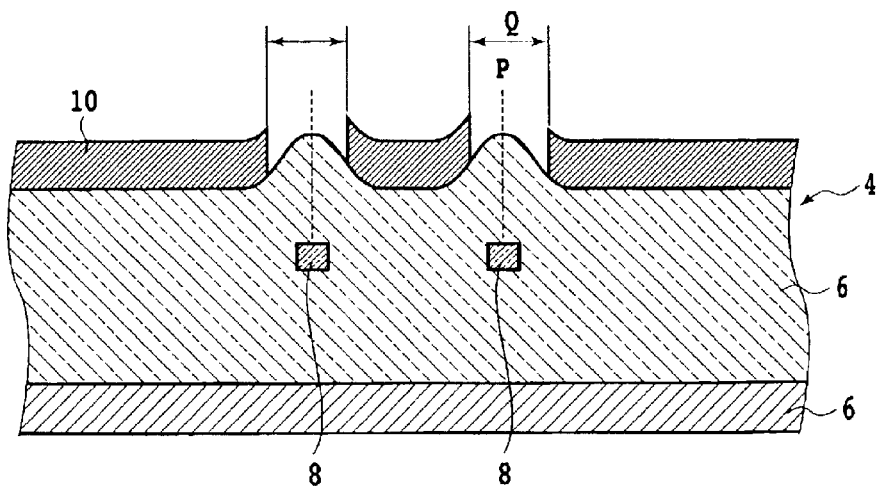
FIG. 2 is a sectional view for illustrating another problem in the prior art method.
Figure 3:
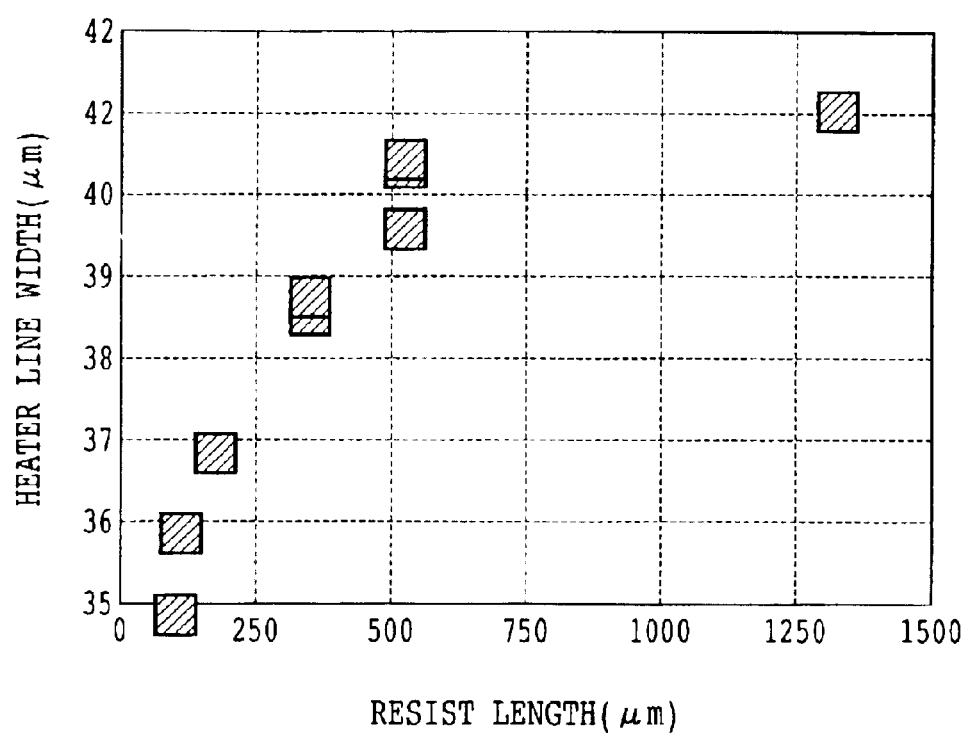
FIG. 3 is a graph showing the relation between resist length and heater line width.
Figure 4:
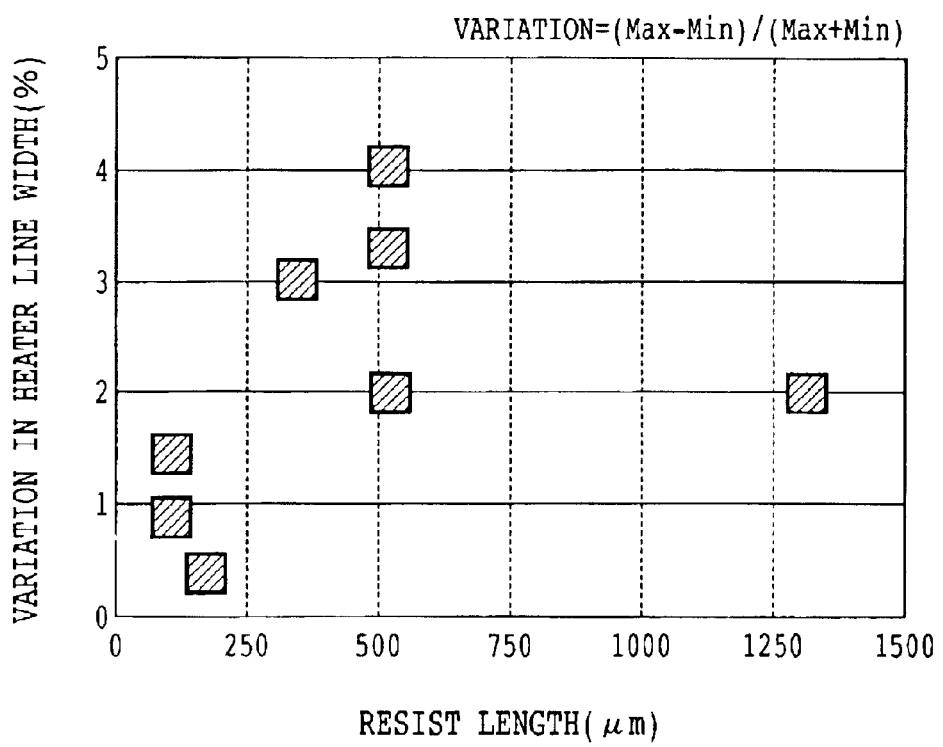
FIG. 4 is a graph showing the relation between resist length and variations in heater line width in the plane of a wafer.
Figure 5:
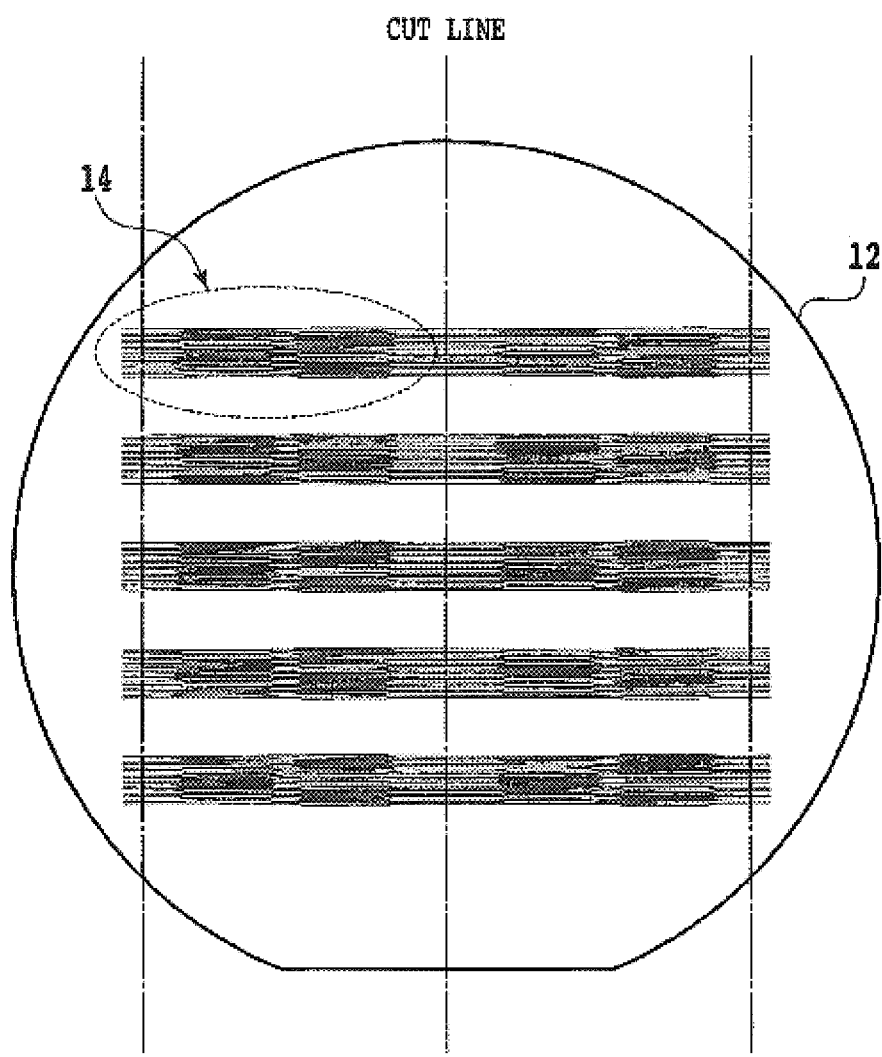
FIG. 5 is a plan view showing the layout of VOA chips on a wafer.
Figure 6:
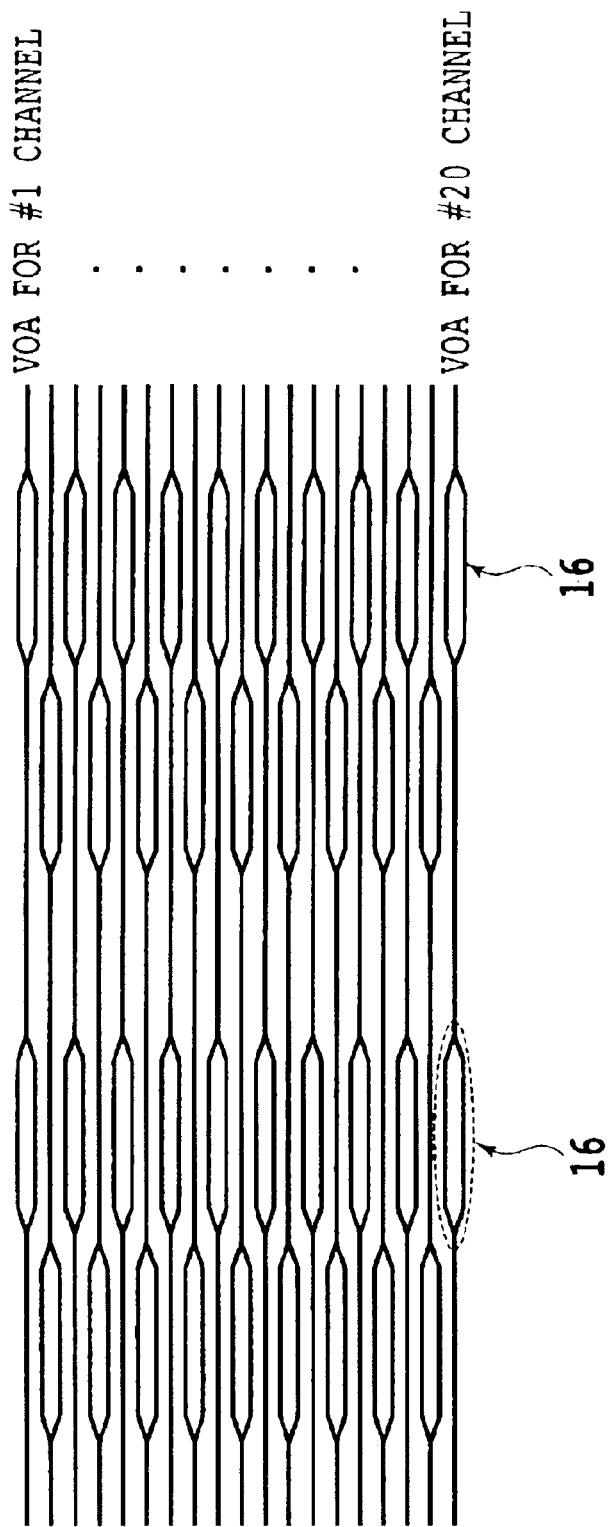
FIG. 6 is a diagram showing the layout of a two-stage MZI type arrayed VOA chip.

Referring to FIG. 5, there is shown an example of the layout of VOA chips 14 formed in an Si wafer 12. As well known in the art, all the processing steps including film deposition and etching are performed in the condition of the wafer 12 to complete the VOA chips 14. Thereafter, the VOA chips 14 formed in the wafer 12 are separated into individual chips by cutting the wafer 12. FIG. 6 shows the layout of a two-stage MZI type arrayed variable optical attenuator chip (VOA chip). In this layout, two Mach-Zehnder interferometer (MZI) type VOAs 16 are connected in series to obtain a high extinction ratio.

Figure 7:
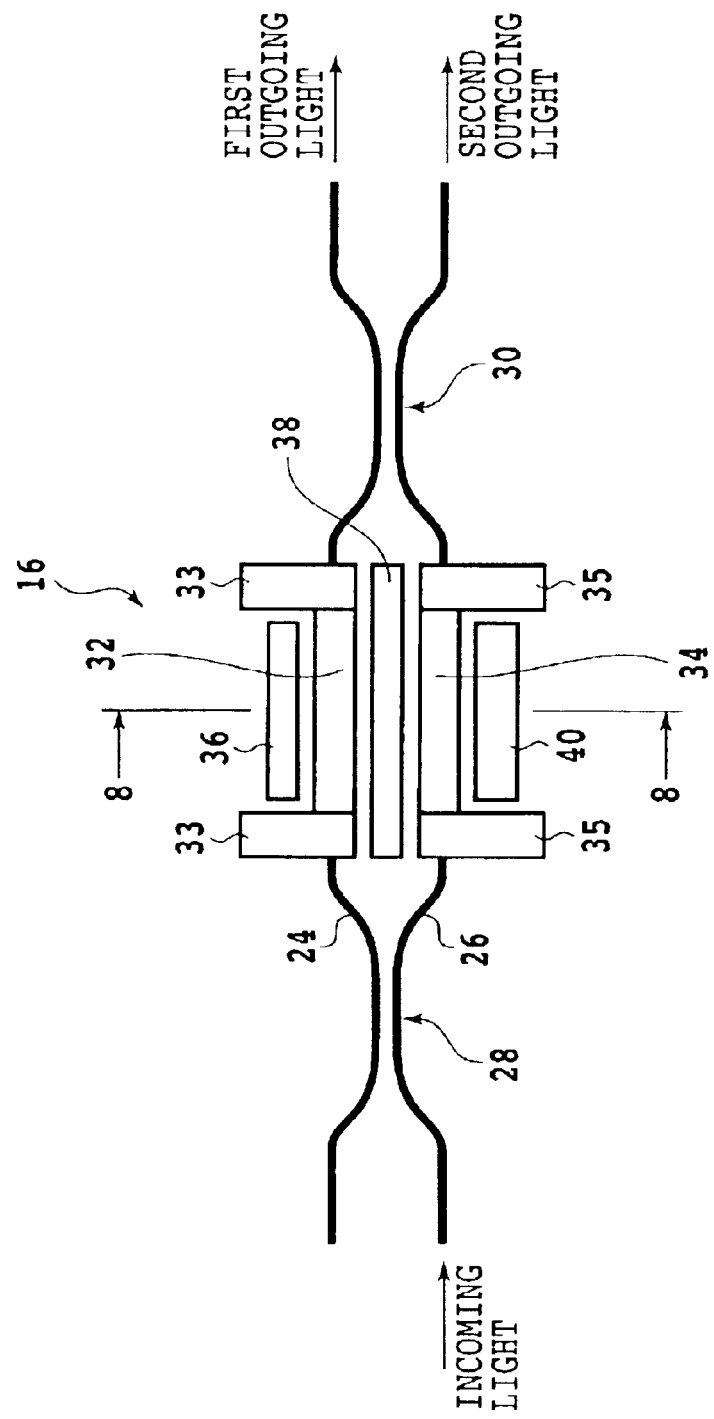
FIG. 7 is an enlarged view of each VOA shown in FIG. 6.
Figure 8:
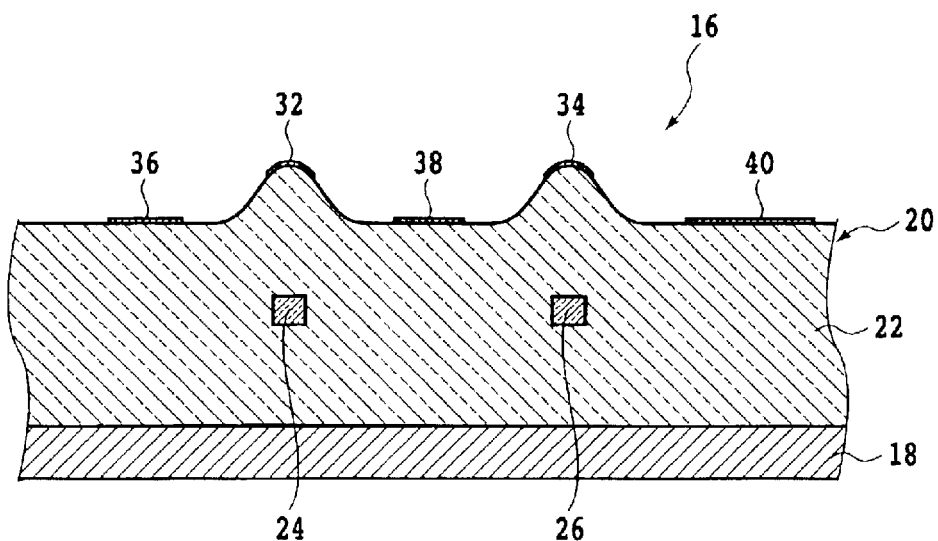
FIG. 8 is a cross section taken along the line 8—8 in FIG. 7.

FIG. 7 is an enlarged view of each VOA 16 shown in FIG. 6 according to a preferred embodiment of the present invention, and FIG. 8 is a cross section taken along the line 8—8 in FIG. 7. As shown in FIG. 8, a planar lightwave circuit 20 is formed on an Si substrate 18. The planar lightwave circuit 20 is composed of a cladding 22 and cores 24 and 26 embedded in the cladding 22. Reference numerals 28 and 30 in FIG. 7 denote 3-dB directional couplers. A thin film heater 32 of Ti/Pt is formed on the cladding 22 at a position directly above the core 24. Similarly, a thin film heater 34 of Ti/Pt is formed on the cladding 22 at a position directly above the core 26.

Reference numerals 36, 38, and 40 denote dummy patterns, which are also formed of Ti/Pt. The dummy pattern 40 is formed at the outermost position on the chip, and the width of the dummy pattern 40 is set larger than that of each of the other dummy patterns 36 and 38. As will be hereinafter described, the reason for this setting is that the amount of shrinkage of a photoresist in formation of the thin film heaters 32 and 34 must be considered. Ti is used as an adhering material to the cladding 22. That is, the thin film heaters 32 and 34 and the dummy patterns 36, 38, and 40 are formed by first depositing Ti on the cladding 22 and next depositing Pt on the Ti layer.

The thin film heaters 32 and 34 and the dummy patterns 36, 38, and 40 may be formed of a material selected from the group consisting of Ti, Pt, Ni, Rh, Cr, and $Ta_2N$ or an alloy thereof. The thin film heater 32 is connected to a pair of electrodes 33, and the thin film heater 34 is connected to a pair of electrodes 35. The electrodes 33 and 35 are formed of Ti/Au, for example.

Signal light entered one end of the core 26 is split at a ratio of 50:50, for example, by the directional coupler 28, and the half of the signal light propagates along the core 24, while the remaining half propagating along the core 26. When electric powers are applied to the thin film heaters 32 and 34, the refractive indices of the cores 24 and 26 are changed by a thermo-optic effect, and the phases of the signal lights propagating along the cores 24 and 26 are accordingly changed. With this change in the phases of the signal lights propagating along the cores 24 and 26, the coupling ratio of the directional coupler 30 on the output side changes. Accordingly, by controlling the electric powers to be applied to the thin film heaters 32 and 34, the proportion of the second outgoing light from one of the output ports of the directional coupler 30 to the first outgoing light from the other output port can be controlled. That is, the power of the first outgoing light or the second outgoing light from the directional coupler 30 to the power of the incoming light to the directional coupler 28 can be attenuated according to the electric powers to be applied to the thin film heaters 32 and 34.

Figure 9A:
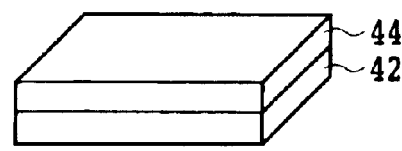
FIGS. 9A to 9H are perspective views for illustrating a manufacturing method for a planar lightwave circuit device according to a preferred embodiment of the present invention.
Figure 9B:
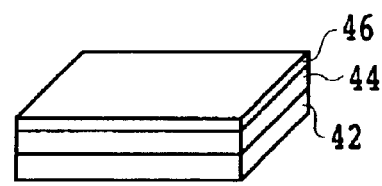
Figure 9C:
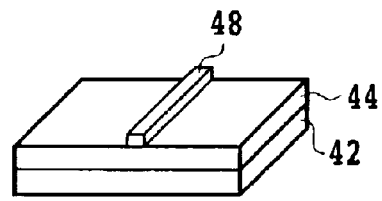
Figure 9D:
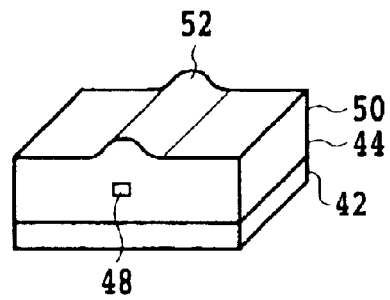

There will now be described a manufacturing method for a planar lightwave circuit device according to a preferred embodiment of the present invention with reference to FIGS. 9A to 9H. As shown in FIG. 9A, an undercladding layer 44 is first deposited on an Si substrate 42 by CVD. As shown in FIG. 9B, a core layer 46 is next deposited on the undercladding layer 44 by CVD. As shown in FIG. 9C, the core layer 46 is next etched by photolithography and reactive ion etching (RIE) to form a core 48. As shown in FIG. 9D, an overcladding layer 50 is next deposited on the undercladding layer 44 by CVD so as to embed the core 48. Since the core 48 is embedded in the overcladding layer 50, the surface of the overcladding layer 50 is formed with a ridge portion 52 corresponding to the core 48.

Figure 9E:
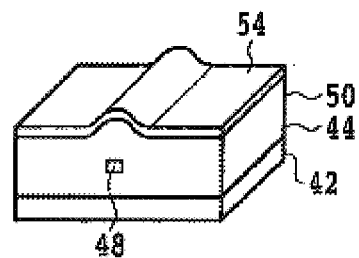

As shown in FIG. 9E, a photoresist 54 as a lift-off mask is next applied to the surface of the overcladding layer 50 to such a thickness as to cover the ridge portion 52 directly above the core 48. As the photoresist 54, a photoresist capable of forming an overhang is preferable. For example, AZ5200NJ manufactured by Clariant Japan K.K. may be used. The lift-off mask is not limited to a photoresist. After applying the photoresist 54, prebaking therefor is performed at about 90° C. Thereafter, the photoresist 54 is exposed to light by using an exposure mask having a heater pattern and dummy patterns, thereby transferring the mask patterns onto the photoresist 54.

Figure 9F:
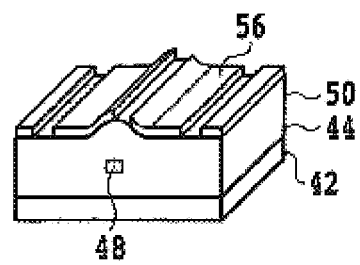

As shown in FIG. 9F, the photoresist 54 after exposure is next developed to form a resist pattern 56 left by the removal of exposed portions of the photoresist 54 corresponding to the heater pattern and the dummy patterns. Thereafter, postbaking for the photoresist 54 is performed at about 120° C. to complete the resist pattern 56. The position and size of each dummy pattern are suitably determined according to the layout of the planar lightwave circuit. Basically, if the spacing between each dummy pattern and the heater pattern is too small, there is a possibility that the dummy pattern and the heater pattern both formed of a deposited material may be short-circuited by any defects such as resist pinholes, so that a desired refractive index change cannot be given to the core 48.

Therefore, the spacing between each dummy pattern and the heater pattern is preferably set to such a spacing as not to influence the device characteristics, e.g., tens of $\mu$m or more. Preferably, each dummy pattern is formed at a position such that the volume of a portion of the photoresist 54 between the heater pattern and the dummy pattern on one side of the heater pattern is substantially equal to the volume of another portion of the photoresist 54 between the heater pattern and the dummy pattern on the other side of the heater pattern. By forming each dummy pattern at such a position, the amount of shrinkage of the photoresist 54 due to the baking of the photoresist 54 and the stress during the film deposition on the resist pattern 56 can be uniformed without adverse effects on the device characteristics, so that thin film heaters with less variations in size can be formed at accurate positions so as to have dimensions faithful to the mask.

Figure 9G:
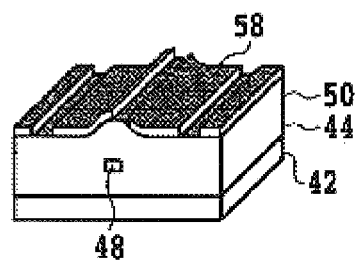
Figure 9H:
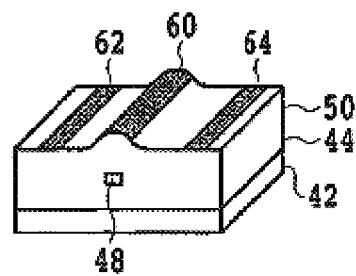

As shown in FIG. 9G, a heater material 58 of Ti/Pt, for example, is deposited on the resist pattern 56 by vacuum evaporation or sputtering. During the deposition of the heater material 58, the shrinkage of the photoresist 54 due to the difference in coefficient of thermal expansion between the photoresist 54 and the heater material 58 can be reduced because the deposited film of the heater material 58 is cut at the positions corresponding to the dummy patterns. Accordingly, thin film heaters with less variations in size can be formed at accurate positions so as to have dimensions faithful to the mask. Thereafter, the photoresist 54 is stripped off by using an organic solvent such as acetone or resist stripper to form a thin film heater 60 and dummy patterns 62 and 64 as shown in FIG. 9H.

While the dummy patterns 62 and 64 are formed on the opposite sides of the thin film heater 60, the spacing between the thin film heater 60 and each of the dummy patterns 62 and 64 is set to a spacing wide enough to eliminate the possibility of short-circuit between the thin film heater 60 and each of the dummy patterns 62 and 64, thereby preventing adverse effects of the dummy patterns 62 and 64 on the device characteristics. Accordingly, it is not necessary to perform any postprocessing step such as a processing step of etching away the dummy patterns 62 and 64, but the dummy patterns 62 and 64 may be left on the device chip. Thus, the overall process can be simplified.

Referring back to FIG. 7, the electrodes 33 and 35 are formed by a method basically similar to the forming method for the thin film heaters 32 and 34. After forming the thin film heaters 32 and 34, a lift-off photoresist is applied again to the surface of the planar lightwave circuit. The photoresist is next prebaked at a given temperature (about 90° C.) and then patterned. Further, the photoresist patterned is postbaked at a given temperature (about 120° C.) and an electrode material of Ti/Au is uniformly deposited on the planar lightwave circuit by vacuum evaporation or sputtering. Thereafter, the photoresist is removed by using an organic solvent to form the electrodes 33 and 35.

Figure 10:
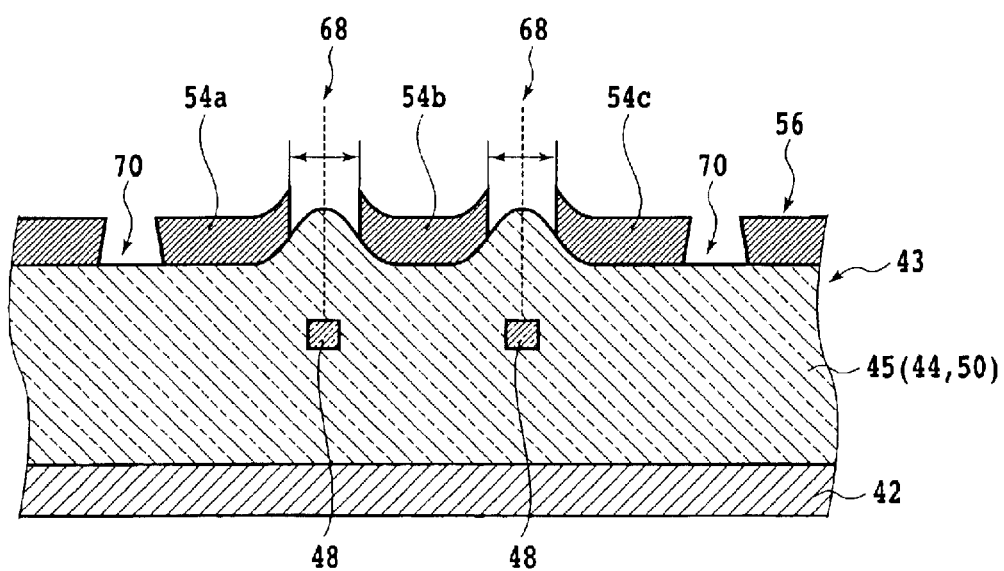
FIG. 10 is a sectional view for illustrating the correction for deviation of the center position of a VOA heater by dummy patterns.

The correction for deviation of the center position of a VOA heater by dummy patterns will now be described with reference to FIG. 10. Reference numerals 68 denote heater patterns, and reference numerals 70 denote dummy patterns. The dummy patterns 70 are formed at positions such that the volume of a photoresist 54a between the heater pattern 68 and the dummy pattern 70 on the left side as viewed in FIG. 10 is substantially equal to the volume of a photoresist 54b between the heater patterns 68 and that the volume of a photoresist 54c between the heater pattern 68 and the dummy pattern 70 on the right side as viewed in FIG. 10 is substantially equal to the volume of the photoresist 54b. By forming the dummy patterns 70 at such positions, the amounts of shrinkage of the photoresists 54a, 54b, and 54c can be made substantially equal to each other. Accordingly, the heater patterns 68 can be formed at accurate positions directly above the cores 48, respectively.

While the present invention is applied to the formation of thin film heaters for a VOA in this preferred embodiment, the present invention is not limited to the preferred embodiment described above, but is similarly applicable to any other PLC devices such as an optical modulator and an optical switch. According to the present invention as described above, the resist shrinkage in the lift-off wiring process can be suppressed to thereby improve the positional accuracy of wiring patterns and reduce variations in size of the wiring patterns.

What is claimed is:

1. A planar lightwave circuit device comprising:
   a substrate;
   a planar lightwave circuit formed on said substrate, said planar lightwave circuit having a cladding and a core embedded in said cladding;
   a first conductive pattern formed on said cladding so as to correspond to said core; and
   a second conductive pattern formed on said cladding so that said second conductive pattern is arranged on at least one side of said first conductive pattern in spaced relationship therewith.

2. A planar lightwave circuit device according to claim 1, wherein said first conductive pattern is formed of a material selected from the group consisting of Ti, Pt, Ni, Rh, Cr, and Ta$_2$N or an alloy thereof.

3. A planar lightwave circuit device according to claim 1, wherein said planar lightwave circuit has a ridge portion above said core and a flat portion;
   said first conductive pattern being formed on said ridge portion.

4. A planar lightwave circuit device according to claim 3, wherein said second conductive pattern is formed of said flat portion.

5. A planar lightwave circuit device according to claim 1, further comprising a pair of electrodes connected to said first conductive pattern.

6. A planar lightwave circuit device comprising:
   a substrate;
   a planar lightwave circuit formed on said substrate, said planar lightwave circuit having a cladding and a plurality of cores embedded in said cladding;
   a plurality of first conductive patterns formed on said cladding so as to respectively correspond to said cores; and
   a plurality of second conductive patterns formed on said cladding so that each of said second conductive patterns is arranged on at least one side of each first conductive pattern in spaced relationship therewith.

7. A planar lightwave circuit device according to claim 6, wherein each of said first conductive patterns is formed of a material selected from the group consisting of Ti, Pt, Ni, Rh, Cr, and Ta$_2$N or an alloy thereof.

8. A planar lightwave circuit device according to claim 7, wherein each of said second conductive patterns is formed of a material selected from the group consisting of Ti, Pt, Ni, Rh, Cr, and Ta$_2$N or an alloy thereof; and
   one of said second conductive patterns formed at the outermost position on said planar lightwave circuit has a width larger than that of each of the other second conductive patterns.

* * * * *